(12) United States Patent
Chen et al.

(10) Patent No.: US 10,126,879 B2
(45) Date of Patent: Nov. 13, 2018

(54) TESTING METHOD OF TOUCH DEVICE AND SYSTEM THEREOF

(71) Applicant: Wistron Corporation, New Taipei (TW)

(72) Inventors: Shih-Wen Chen, New Taipei (TW); Chun-Chieh Li, New Taipei (TW); Ya-Ping Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 988 days.

(21) Appl. No.: 14/174,854

(22) Filed: Feb. 7, 2014

(65) Prior Publication Data
US 2015/0100254 A1   Apr. 9, 2015

(30) Foreign Application Priority Data
Oct. 9, 2013   (TW) .............................. 102136569 A (51) Int. Cl.
*G06F 3/042*   (2006.01)
*G06F 3/041*   (2006.01)

(52) U.S. Cl.
CPC ............ *G06F 3/042* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 8,890,847 B2 * | 11/2014 | Chen | G06F 3/0416 345/175 |
| 2011/0083042 A1 * | 4/2011 | Chang | G06F 11/2221 714/31 |
| 2012/0280934 A1 * | 11/2012 | Ha | G06F 11/2221 345/174 |
| 2013/0120250 A1 | 5/2013 | Lin et al. | |
| 2014/0043038 A1 * | 2/2014 | Chen | G01R 31/28 324/537 |

FOREIGN PATENT DOCUMENTS

| | | |
|---|---|---|
| TW | 200943144 | 10/2009 |
| TW | 201039203 | 11/2010 |
| TW | 201322058 | 6/2013 |

OTHER PUBLICATIONS

"Office Action of Taiwan Counterpart Application", dated Feb. 25, 2015, with English translation thereof, p. 1-p. 18.

* cited by examiner

*Primary Examiner* — Leslie J Evanisko
(74) *Attorney, Agent, or Firm* — JCIPRNET (57) ABSTRACT

A testing method of a touch device and a system thereof are provided. The testing method includes following steps. A test sensing information generated by the touch device is received, and the test sensing information is physical characteristic information provided by sensors of the touch device. A test gesture signal and a test keypad signal generated by the touch device are received, the test gesture signal includes gesture coordinates provided by touch device, and the test keypad signal includes a keypad key triggering signal generated by the touch device. According to a preset table, in order to generate a test result, whether the test sensing information, the test gesture signal, and the test keypad signal match data of the preset table or not is determined, and whether the touch device works properly is determined according to the test result.

7 Claims, 4 Drawing Sheets

TESTING METHOD OF TOUCH DEVICE AND SYSTEM THEREOF

CROSS-REFERENCE TO RELATED APPLICATION

This application claims the priority benefit of Taiwan application serial no. 102136569, filed on Oct. 9, 2013. The entirety of the above-mentioned patent application is hereby incorporated by reference herein and made a part of this specification.

BACKGROUND OF THE INVENTION

1. Field of the Invention

The invention generally relates to a testing method and a system thereof, in particular, to a testing method of a touch device and a system thereof.

2. Description of Related Art

With the development of the technology, touch devices have gradually replaced physical keypads or traditional keyboards and act as new-generation input devices. Besides, the touch devices have become the basic configuration of electronic apparatuses, e.g., laptops, cell phones, tablet PC, other portable multi-media players, etc. Capacitive, resistive, and optical touch devices are the common touch devices on the electronic apparatuses. In addition, with the development of multi-touch technology, touch gestures derived from the multi-touch technology provide users with a more intuitive operation experience, and thereby the users may operate the electronic apparatuses more easily and quickly.

In order to test the quality of the multi-touch devices, a series of testing steps may be performed on the touch devices prior to the ex-factory dates of these touch devices, so as to guarantee the touch functions of the touch devices. According to the existing testing method, gestures corresponding to the instructions issued by the test programs are given to the touch devices manually or by machines, and then the touch devices determine the gestures according to the physical characteristic information obtained through the touch actions and accordingly perform operations (e.g., a page-flip function). Thus, testers may determine whether the touch devices work properly according to the operations corresponding to the gestures. However, if the testers intend to learn more about whether the process of determining the gestures by the touch devices is correct, it is hard to achieve said purpose through simple manual inspection. As a result, it is necessary to develop a testing technique that may better satisfy the requirements for inspection in the pertinent industry.

SUMMARY OF THE INVENTION

Accordingly, the invention is directed to a testing method of a touch device and a system thereof, so as to check functions of the touch device in an automated manner and determine whether the gesture signal and/or the simulated keypad signal generated by the touch device work properly.

The invention is directed to a testing method of a touch device. The testing method includes the following steps. A test sensing information generated by the touch device is received, wherein the testing sensing information is the physical characteristic information provided by at least one sensor on the touch device. A test gesture signal and a test keypad signal generated by the touch device are received, wherein the test gesture signal includes the coordinate of the gestures provided by the touch device, and the test keypad signal includes at least one keypad key triggering signal provided by the touch device. Whether the test sensing information, the test gesture signal, and the test keypad signal match the data in a preset table is determined according to the preset table so as to generate a test result. Then, whether the touch device works properly is determined according to the test result.

In an embodiment of the invention, the preset table includes a preset sensing information, a preset gesture signal, and a preset keypad signal. The step of determining if the test sensing information, the test keypad signal, and the test touch signal match the data in the preset table according to the preset table includes the following: whether the test sensing information matches the preset sensing information is determined. If the test sensing information matches the preset sensing information, whether the test gesture signal matches the preset gesture signal is determined, and whether the test keypad signal matches the preset keypad signal is determined. If the test gesture signal matches the preset gesture signal, and if the test keypad signal matches the preset keypad signal, it is determined that the device works properly.

In an embodiment of the invention, the preset table includes the preset sensing information, the preset gesture signal, and the preset keypad signal. The step of determining if the test sensing information, the test keypad signal, and the testing touch signal match the data in the preset table according to the preset table includes the following: whether the test sensing information matches the preset sensing information is determined. Whether the test keypad signal is received is determined if the test sensing information matches the preset sensing information. It is determined whether the test keypad signal matches the preset keypad signal if the test keypad signal is received. In addition, it is determined that the touch device works properly if the test keypad signal matches the preset keypad signal.

From another perspective, the invention is directed to a testing system that includes a touch device and a test device. The touch device includes at least one sensor and a touch processing unit. The touch device receives a user's operation to generate test sensing information. The touch processing unit generates a test gesture signal according to the test sensing information, wherein the test gesture signal includes coordinate of gestures, and the test keypad signal includes at least one keypad key triggering signal. The test device is coupled to the touch device. The test device receives the test sensing information, the test gesture signal, and the test keypad signal generated by the touch device. In addition, the test device generates a test result by determining if the test sensing information, the test gesture signal, and the test keypad signal match the data in the preset table according to the preset table and determines if the touch device works properly according to the test result.

In an embodiment of the invention, the preset table includes a preset sensing information, a preset gesture signal, and a preset keypad signal. The step of determining if the test sensing information, the test keypad signal, and the test touch signal match the data in the preset table by the test device according to the preset table includes the following: whether the test sensing information matches the preset sensing information is determined. If the test sensing information matches the preset sensing information, whether the test gesture signal matches the preset gesture signal and whether the test keypad signal matches the preset keypad signal are determined. It is determined that the device works properly if the test gesture signal matches the preset gesture signal and if the test keypad signal matches the preset keypad signal.

In an embodiment of the invention, the preset table includes a preset sensing information, a preset gesture, and a preset keypad signal. The step of determining if the test sensing information, the test keypad signal, and the testing touch signal match the data in the preset table by the test device according to the preset table includes the followings. Whether the test sensing information matches the preset sensing information is determined. Whether the test keypad signal is received is determined if the test sensing information matches the preset sensing information. It is determined whether the test keypad signal matches the preset keypad signal if the test keypad signal is received. In addition, it is determined that the touch device works properly if the test keypad signal matches the preset keypad signal.

Based on the above description, the touch device provided in the exemplary embodiments of the invention may generate the gesture signal and/or the keypad signal according to user's operations. The touch device or other devices connected to the touch device may perform the corresponding actions based on the gesture signal and/or the keypad signal. The test device may compare the preset data in the preset table with each signal generated by the touch device and make judgment upon the comparison, so as to determine if the touch device works properly. Accordingly, the testing system provided in the exemplary embodiments of the invention may integrate the inspection of the basic touch function and the keypad signal function and may also speed up the testing process of each touch device on the assembly line in an automated manner. By doing so, the tester does not need to waste his or her time on determining whether each touch device works properly during the testing process.

Several exemplary embodiments accompanied with figures are described below in detail to further explain the disclosure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In order to test the basic touch function and the keypad signal function of a touch device in an automated manner, a testing method and a system thereof are provided herein. The touch device being tested in the testing system may receive the user's operation so as to generate a test sensing information, a test gesture signal, and a test keypad signal. The test device in the testing system may determine whether the test sensing information, the test gesture signal, and the test keypad signal match each data in the preset table according to the built-in preset table so as to generate the test result. After that, whether the touch device being tested works properly is determined by the test device according to the test result. Thereby, the tester is no longer required to test whether the transmitted gesture signal and/or the transmitted keypad signal performs operations properly in the device being tested. In other words, the test device described in the embodiment of the invention is capable of automatically testing whether the touch device works properly. Embodiments are provided as references for illustrating the scope and spirit of the invention, but the scope and the spirit of the invention are not limited by the following embodiments.

Figure 1:
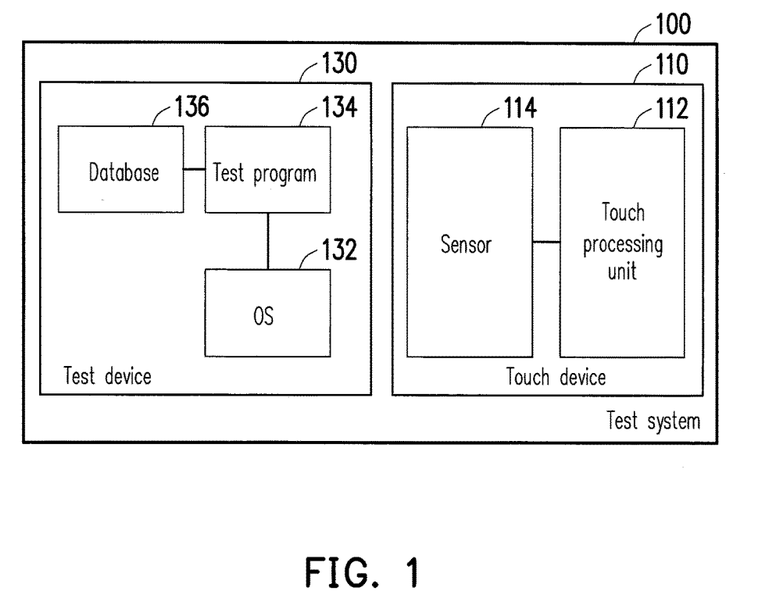
FIG. 1 is a block diagram illustrating a testing system according to an embodiment of the invention.

FIG. 1 is a block diagram illustrating a testing system according to an embodiment of the invention. With reference to FIG. 1, the testing system 100 may include a touch device 110 and a test device 130, wherein the touch device 110 and the test device 130 are coupled to each other. The touch device 110 may connect and communicate with the test device 130 through many types of data transmission interfaces such as Universal Serial Bus (USB) or Inter-Integrated Circuit (I2C), and inspection and debug process may also be performed on the touch device 110 through these interfaces. Users may decide the proper data transmission interface according to the present embodiment, while the embodiment of the invention does not limit the way to couple the touch device 110 to the test device 130.

The user may use gestures such as clicking, sliding, dragging, double-clicking and press-holding on the touch device 110 as well as the multi-touch gestures. The touch device 110 may generate corresponding operation signals through the user's operations (e.g., moving a cursor, selecting an object, zooming in a window, closing a window, etc.). The touch device 110 may even generate a simulated keypad signal (e.g., keys A, B, and C on a keypad) to other electronic devices (e.g., a computer) connected with the touch device through the internal hardware devices or firmware chipsets of the touch device 110. In addition, in order to meet the requirement of development/testing, the developer/tester setups the touch device 110 to be capable of generating signals which may be analyzed easily by the developer/tester, such as physical characteristic information (e.g., a gesture output or a location of the object sensed by a sensor), a touch signal (e.g., a trace of gesture movement or a coordinate of the object being sensed), and so forth. In order to overcome the related technical difficulties encountered during production or testing, the physical characteristic information, the operation signal, the simulated keypad signal, and/or the touch signal generated by the touch device 110 may be sent to the test device 130 through many types of data transmission interfaces according to the present embodiment of the invention, so that the developer/tester may test the touch device 110 to see whether it works properly according to the signals received. Besides, the test result may be stored in the database for future development and adjustment.

In the present embodiment, the touch device 110 may be, for example, a capacitive touch device, a resistive touch device, or an optical touch device. The touch device 110 may also be a capacitive touch module, a resistive touch module, or an optical touch module assembled to an electronic device (e.g., a cell phone, a tablet PC, a laptop, etc.); however, the invention is not limited thereto.

The touch device 110 may include the touch processing unit 112 and at least one sensor 114, wherein the touch processing unit 112 is coupled to the sensor 114. The touch processing unit 112 may be the chipsets having the calculating ability, a microprocessor, or a micro control unit (MCU). In addition, the touch processing unit 112 is the processing unit or the microprocessor responsible for all the operations taking place in the touch device 110.

The number, the type, and the location of the at least one sensor 114 described in the embodiment of the invention may be determined according to the touch technology of the touch device 110. For example, if the optical touch technology is applied to the touch device 110, the touch device 110 has at least two image sensors (e.g., CMOS or CCD), and each of the image sensors is placed on one of two sides of the touch device 110. However, the number and the type of the optical sensor in the embodiment of the invention are not limited thereto. If the capacitive touch technology is applied to the touch device 110, the sensors may be placed under all of the touch surfaces of the touch device 110; however, the number and the location of the capacitive sensors are not limited to those provided in the present embodiment.

The test device 130 may be a desktop computer, a laptop computer, or any other device capable of testing the touch device 110 and having corresponding data transmission interface. An operating system 132 (OS), a test program 134, and a database 136 may be installed in the test device 130. The operating system 132 may be capable of running the test program 134 and the database 136, such as MICROSOFT WINDOWS, MAC OS X, LINUX, etc. The test program 134 is used for testing all the functions of the touch device 110 (e.g., determining whether the multi-touch function works properly) and testing other related debug information. However, the testing functions provided in the invention are not limited thereto. In addition, the database 136 provides reference information for all the tests in the test program 134, and the test result is stored in the database 136 for the developer or the tester to do further analysis.

When the tester is testing the touch device, a test program is used to test the touch device. Conventionally, when the keypad signals (e.g., the keypad signal generated by pressing Alt+tab or Command+Tab on the traditional keypad) are generated during testing, and when the functions of the keypad are required to be tested, the tester needs to manually determine whether the operation corresponding to the keypad signal is correct in the operating system, which wastes a lot of time. A testing method for the tester to perform tests easily and fast is provided by the embodiment of the invention and is described in detail below.

Figure 2:
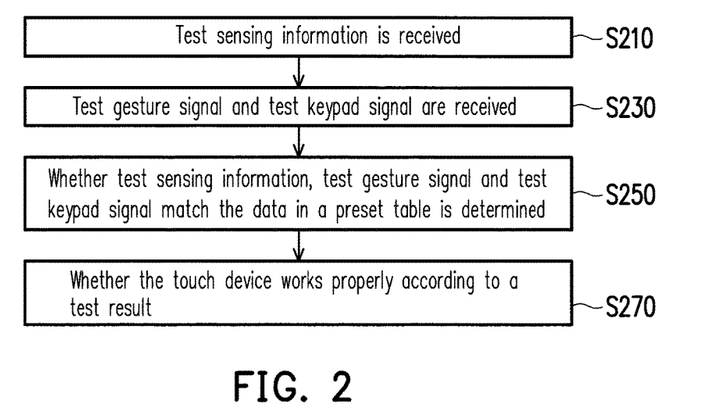
FIG. 2 is a flow chart illustrating a testing method of a testing system according to an embodiment of the invention.

FIG. 2 is a flow chart illustrating a testing method of the testing system 100 according to an embodiment of the invention. With reference to FIG. 2, the testing method provided by the present embodiment is applicable for the testing system 100 in FIG. 1, and the testing method provided by the embodiment of the invention is described below with reference to each component of the testing system 100. Each step of the testing method may be adjusted according to the actual requirements and is not limited thereto.

In the present embodiment, the touch device 110 receives signals from or transmits signals to the test device 130 via a USB transmission interface. If the touch device 110 is connected to the test device 130 via the USB transmission interface, then the OS (e.g., WINDOWS 7 or WINDOWS 8) of the test device 130 may inquire the touch device 110 of the functions of the touch device 110 via the USB transmission interface when the test device 130 is turned on. In addition, the touch device 110 may send report descriptors to the test device 130. For example, the specification of the report descriptor is made by the test device 130 if MICROSOFT WINDOWS is the OS installed in the test device 130, and the touch device 110 may write the report descriptor according to the specification, so that the test device 130 may be informed of the functions of the touch device 110. In the present embodiment, the touch device 110 may send the test sensing information, the test gesture signal, and the test keypad signal. Table 1 shows header information specified in an embodiment of the invention for transmitting the test sensing information, the test gesture signal, and the test keypad signal via the USB transmission interface. The test device 130 may determine the type of information sent by the touch device 110 according to the header information listed in Table 1.

TABLE 1

| Header | 0x01 | 0x07 | 0x0B |
|---|---|---|---|
| Signal | Test Gesture Signal | Test Sensing Information | Test Keypad Signal |

As shown in Table 1, the header of the test gesture signal is "0x01", the header of the test sensing information is "0x07", and the header of the test keypad signal is "0x0B". The test device 130 may also determine the type of the information sent by the touch device 110 through other methods, for example, by sending the information through different pins, etc.

In the present embodiment, when the test gesture signal is transmitted via the USB transmission interface by the touch device 110, please refer to Table 1 and Table 2. Table 2 shows the packet format for loading the test gesture signal according to the header setting in Table 1. The test gesture signal may be loaded according to the packet format shown in Table 2, but the invention is not limited thereto.

TABLE 2

| 0x01 | Coordinate information of the first object being sensed | . . . | Coordinate of the $N^{th}$ object being sensed | Number of the objects being sensed |
|---|---|---|---|---|

Table 2 represents the packet format of the test gesture signal. In Table 2, the header of the packet is "0x01", the next column contains the coordinate information of the object being sensed by the sensor 114 in the touch device 110, and the last column contains the number of objects being sensed by the sensor 114. Since the touch device 110 may perform the multi-touch test, the tester may set n as the number of objects being sensed for sending the test gesture signal according to the testing operation. For example, n may be set as 2 so as to receive the physical characteristic information of two objects being sensed, the first byte in Table 2 is "0x01", and the header, the coordinate of the first object being sensed, the coordinate of the second object being sensed, and the number of the objects being sensed occupy 14 bytes in total. In another embodiment, the test gesture signal may further include the trace of gesture movement. For example, if the sensor 114 in the touch device 110 detects that the object being sensed is moving, then for every 0.5 second, the touch processing unit 112 adds the trace of the gesture movement within the interval of every 0.5 second to the test gesture signal packet 112, so that the trace of the gesture movement may be sent to the test device 130. However, the methods of transmitting and recording of the trace of the gesture movement in the invention are not limited to those described herein.

When the test sensing information is transmitted via the USB transmission interface by the touch device 110, and the touch device 110 is equipped with two sensors 114 having a left camera and a right camera in an embodiment, please refer to Table 1 and Table 3. Table 3 shows the packet format for loading the test sensing information according to the header setting in Table 1, and the packet format shown in Table 3 may be applied to load the test sensing information according to the present embodiment.

TABLE 3

| 0x07 | Gesture Output | Number and location of the objects being sensed by the left camera | Number and location of the objects being sensed by the right camera |
|---|---|---|---|

Table 3 represents the packet format of the test sensing information. In Table 3, the header of the package is "0x07", and the gesture output column represents the output of touch gestures. The last two columns record the locations of the objects being sensed by the left camera and the right camera of the sensors 114. For example, the tester may determine the value of the touch gestures in the "Gesture Output" column. For example, "1" in the "Gesture Output" column represents an upward gesture, "2" represents a downward gesture, "3" represents a leftward gesture, "4" represents a rightward gesture, "5" represents 5 fingers touching the touch screen and sliding inwardly, and "0" represents no gesture. However, those values and the corresponding gestures are not limited to those provided above. The touch processing unit 112 may determine gestures according to the gesture information sensed by the sensor 114 and fill in the "Gesture Output" column with the determined gesture. In another embodiment, the touch device 110 has a sensor 114 to which the capacitive technology is applied, and the test sensing information may include the packet header "0x07" and the "Gesture Output" column, so that the test sensing information may be sent to the test device 130 via the USB transmission interface; however, the invention is not limited thereto.

In addition, when the test keypad signal is transmitted via the USB transmission interface by the touch device 110, please refer to Table 1 and Table 4. Table 4 shows the packet format for loading the test keypad signal according to the header setting in Table 1. The packet format of Table 4 may be used to load the test keypad signal, but the invention is not limited thereto.

TABLE 4

| 0x0B | Keypad Key Triggering Signal |
|---|---|

Table 4 represents the packet format of the test keypad signal. In Table 4, the header of the packet is "0x0B", and the keypad key triggering signal may be simulated from the signal generated by the traditional keypad. For example, the touch device 110 has preset the different simulated keypad signals corresponding to different OS. When the touch device 110 is connected to the test device 130, the driver in the OS 132 of the test device 130 provides the information of its OS to the touch device 110, and the touch processing unit 112 in touch device 110 may transmit the corresponding simulated keypad signal according to the information of the OS. In another embodiment, the touch device 110 has set the simulated keypad signal to be used for one single OS only. Note that the settings of the simulated keypad signal of the invention are not limited to those described above.

In an embodiment, MICROSOFT WINDOWS is the OS 132 of the test device 130 known by the touch device 110, or the touch device 110 may only be compatible with MICROSOFT WINDOWS. Table 5 is the correspondence table showing the relationships between the gesture output and the simulated keypad key compatible with MICROSOFT WINDOWS and serves as an example to describe the present embodiment, which should however not be construed as a limitation to the invention. The correspondence relationships may be adjusted according to the actual requirements. The relationship between the simulated keypad key corresponding to the keypad key triggering signals and the output gesture as shown in Table 5 may be manually set up or preset.

TABLE 5

| Output Gesture | Simulated Keypad Key |
|---|---|
| 5 fingers upward | Windows + Up Arrow |
| 5 fingers downward | Windows + Down Arrow |
| 5 fingers leftward | Alt + Shift + Tab |
| 5 fingers rightward | Alt + Tab |
| 5 fingers inward | Alt + F4 |

In another embodiment, MAC OS X is the OS 132 of the test device 130 known by the touch device 110, or the touch device 110 is compatible with MAC OS X only. Table 6 is the correspondence table showing the relationships between the output gesture and the simulated keypad key compatible with MAC OS X. The relationship between the simulated keypad key corresponding to the keypad key triggering signals and the output gesture as shown in Table 6 may be manually set up or preset. However, the invention is not limited thereto.

TABLE 6

| Output Gesture | Simulated keypad key |
|---|---|
| 5 fingers upward | Control + Up Arrow |
| 5 fingers downward | Control + Down Arrow |
| 5 fingers leftward | Command + Shift + Tab |
| 5 fingers rightward | Command + Tab |
| 5 fingers inward | Command + W |

In another embodiment, the touch device 110 may be set to be in the debug mode. Table 7 is the correspondence table showing the relationships between the output gesture and the simulated keypad key according to another embodiment of the invention. The relationship between the simulated keypad key corresponding to the keypad key triggering signals and the output gesture as shown in Table 7 may be manually set up or preset, so that the tester may perform tests easily; however, the invention is not limited thereto, and the relationships between the output gesture and the simulated keypad key are not limited to those listed in Table 1 to Table 5. Note that the correspondence table may be set up manually or automatically.

TABLE 7

| Output Gesture | Simulated Keypad key |
|---|---|
| 5 fingers upward | A |
| 5 fingers downward | B |
| 5 fingers leftward | C |
| 5 fingers rightward | D |
| 5 fingers inward | E |

Figure 3:
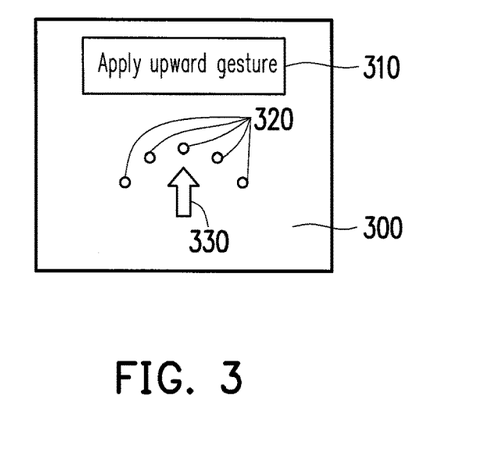
FIG. 3 is a schematic diagram illustrating an interface of a test program in a test device according to an embodiment of the invention.

In order for the tester to perform the tests on the production lines, the test program is often used to test each function of the touch device 110. FIG. 3 is a schematic diagram illustrating an interface of the test program 134 in the test device 130 according to an embodiment of the invention. With reference to FIG. 3, the user interface (UI) 300 of the test program 134 may include a text instruction 310, the number of objects 320 being sensed, and a direction 330 of the gesture. The tester may perform tests according to the instructions shown on the UI 300, but the instructions are not limited to those provided above.

After the tester applies gestures on the touch device 110 according to the UI 300, please refer to FIG. 2 again. In the step S210, the test device 130 receives the test sensing information generated by the touch device 110. In detail, in an embodiment as shown in FIG. 3, the touch device 110 may transmit the test sensing information to the test device 130 according to the request from the test program 134 or according to the packet transmission format of the USB transmission interface in Table 3, wherein the test sensing information may include the physical characteristic information, such as the gesture output, the touch position, and the location of the objects being sensed by the sensors. In addition, the locations of the objects being sensed by the sensors may be the locations of the objects respectively sensed by the left camera and the right camera or the locations of the objects sensed by the sensors in any direction through applying the touch technology. However, the invention is not limited thereto.

In the step S230, the test gesture signal and the test keypad signal generated by the touch device 110 are received from the touch device 110. In an embodiment, the touch device 110 may transmit the test gesture signal and the test keypad signal to the test device 130 according to the packet transmission format of the USB transmission interface shown in Table 2 and Table 4.

In the step S250, whether the test sensing information, the test gesture signal, and the test keypad signal match the data in the preset table according to the preset table is determined in order to generate a test result. In detail, Table 8 is a preset table containing the preset sensing information, the preset gesture signal, and the preset keypad signal according to an embodiment of the invention. With reference to Table 8 and with reference to Table 2 to Table 4 and Table 7, Table 8 may include the preset sensing information corresponding to the number of the objects being sensed, as well as the preset gesture signal and the preset keypad signal corresponding to the preset sensing information, but the invention is not limited thereto. However, the preset table of the invention may be set by the tester/developer and is not subject to Table 8. In addition, the preset table may be adjusted together with the change to the tests in the test program, and embodiments are provided below to elaborate how the test result is generated according to the preset table.

TABLE 8

| # of the objects being sensed | Preset Sensing Information | | | | Preset Gesture Signal | | | | Preset Keypad Signal | |
|---|---|---|---|---|---|---|---|---|---|---|
| 0 | None | | | | 0x01 0x00 ... 0x00 The first byte is 0x01, the rest is 0x00, 14 bytes in total | | | | None | |
| 1~2 | None | | | | 0x01 | Coordinate of the 1st object being sensed | Coordinate of the 2nd object being sensed | # of the objects being sensed | None | |
| More than 3 objects being sensed & no touch gesture detected | 0x07 | Gesture output | Location of the object being sensed by left camera | Location of the object being sensed by right camera | 0x01 0x00 ... 0x00 The first byte is 0x01, the rest is 0x00, 14 bytes in total | | | | None | |
| More than 3 objects being sensed & touch gesture detected | 0x07 | Gesture output | Location of the object being sensed by left camera | Location of the object being sensed by right camera | 0x01 0x00 ... 0x00 The first byte is 0x01, the rest is 0x00, 14 bytes in total | | | | Upward Downward Leftward Rightward Inward | A B C D E |

Figure 4:
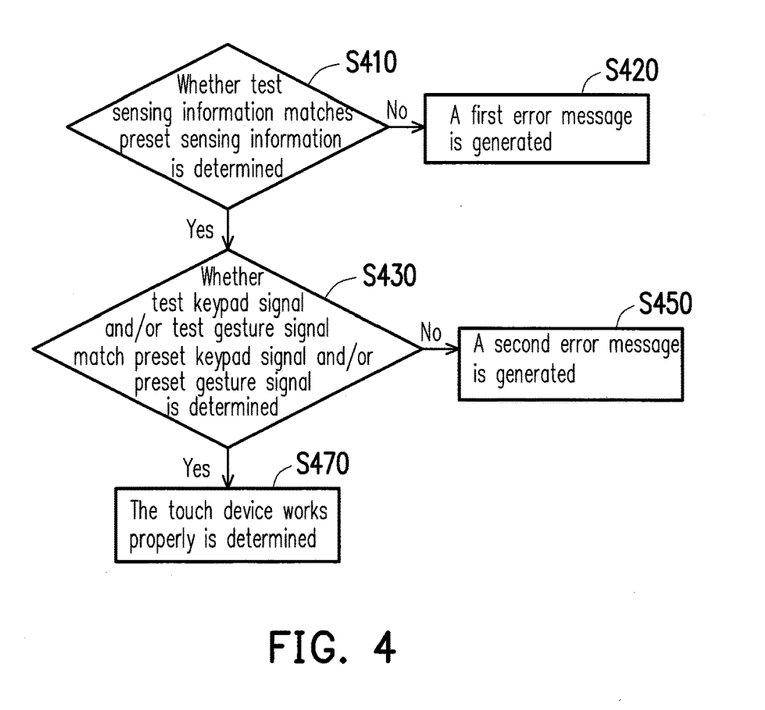
FIG. 4 is a flow chart illustrating a test device judges a test sensing information, a test gesture signal, and a test keypad signal according to a preset table and generates a test result according to an embodiment of the invention.

FIG. 4 is a flow chart illustrating that the test device 130 judges a test sensing information, a test gesture signal, and a test keypad signal according to a preset table and generates a test result according to an embodiment of the invention.

With reference to FIG. 4, in the step S410, the test device 130 determines if the test sensing information matches the preset sensing information in the preset table (e.g., Table 8). A first error message is generated when the test sensing information is different from the preset sensing information (step S420). If the test sensing information matches the preset sensing information, whether the test gesture signal matches the preset gesture signal corresponding to the preset sensing information in the preset table is determined, and whether the test keypad signal matches the preset test signal corresponding to the preset sensing information in the preset table is determined (step S430). If the test keypad signal and/or the test gesture signal are different from the preset keypad signal and/or the preset gesture signal corresponding to the preset sensing information in the preset table, then a second error message is generated (step S450). If the test keypad signal and the test gesture signal match the preset keypad signal and the preset gesture signal corresponding to the preset sensing information in the preset table, then it is determined that the touch device 110 works properly (step S470).

Figure 5:
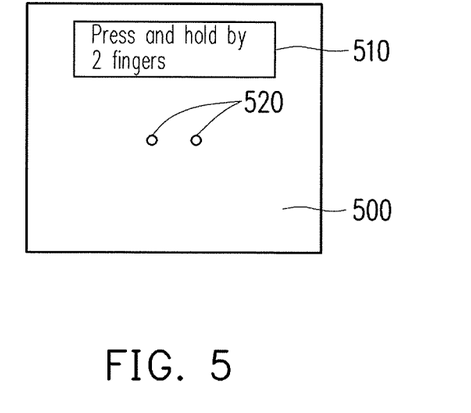
FIG. 5 is a schematic diagram illustrating a test program in a test device according to another embodiment of the invention.

For example, FIG. 5 is a schematic diagram illustrating the test program 134 in the test device 130 according to another embodiment of the invention. With reference to FIG. 5, the user interface 500 of the test program 134 may include a text instruction 510 and the number of the sensed objects 520. The tester may perform tests by following the instructions on the user interface 500. With reference to Table 8 again, the tester places two fingers on the touch device 110 according to the instruction on the user interface 500 of the test program 134. When the user interface 500 of the test program 134 instructs the tester to operate with two fingers, then whether the test sensing information and the preset keypad signal do not exist is determined according to the second row of the preset table 8; that is, when the number of the object being sensed ranges is 1 or 2, both the preset sensing information and the preset keypad signal do not exist (e.g., the data after the header of the packet are all 0x00)). If the test sensing information and the preset keypad signal do not exist, and the test keypad signal and/or the test gesture signal do/does not match the preset keypad signal and/or the preset gesture signal corresponding to the preset sensing information in Table 8, then error messages, for example, "Failed! Wrong gesture!" may be displayed as the text instruction 510 on the user interface 500 of the test program 134, as shown in FIG. 5. If the test sensing information and the preset keypad signal exist, then error messages, for example, "Failed! Wrong gesture!" may be displayed as the text instruction 510 on the user interface 500 of the test program 134, as shown in FIG. 5. In other words, if the test keypad signal and the test gesture signal match the preset keypad signal and the preset gesture signal corresponding to the preset sensing information in Table 8, then success messages, for example, "Passed!" may be displayed as the text instruction 510 on the user interface 500 of the test program 134, as shown in FIG. 5. However, the invention is not limited to the tests described in the present example, and the tests may be modified according to the tester/developer's needs.

In the above embodiments, the test program 134 only determines whether the received test keypad signal is correct. However, the touch device 110 may not send out the test keypad signal due to internal false settings or data anomalies. Based on the aforementioned embodiments, the tester may only be informed that the test keypad signal is incorrect. Thus, another embodiment for overcoming this issue is provided below.

Figure 6:
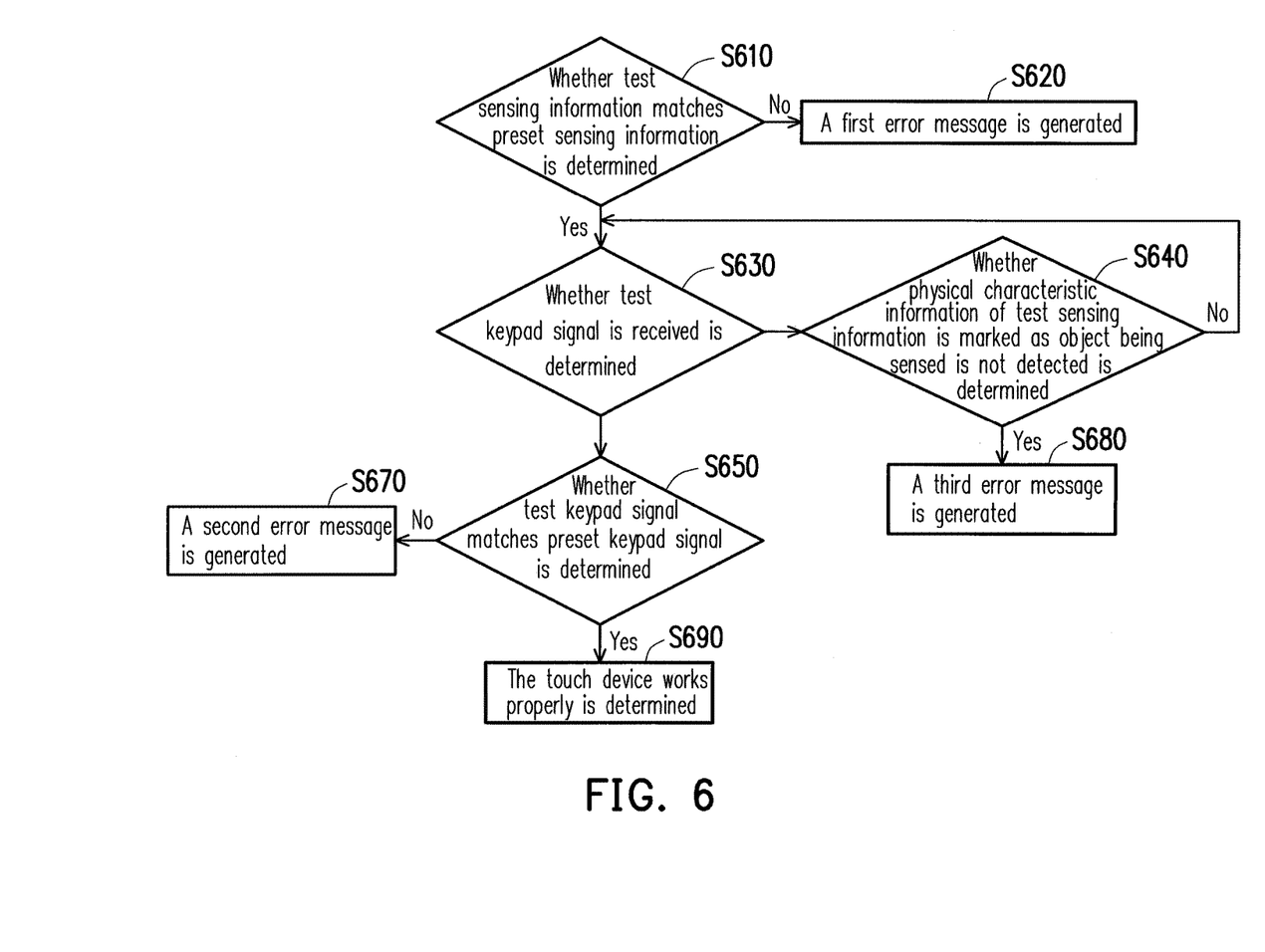
FIG. 6 is a flow chart illustrating a test device judges a test sensing information, a test gesture signal, and a test keypad signal according to a preset table and generates a test result according to another embodiment of the invention.

FIG. 6 is a flow chart illustrating a test device judges a test sensing information, a test gesture signal, and a test keypad signal according to a preset table and generates a test result according to another embodiment of the invention. The steps S610 and S620 in FIG. 6 correspond to the steps S410 and S420 in FIG. 4 which illustrates the same process, and therefore related descriptions are already provided above.

With reference to FIG. 6, in the step S630, if the test sensing information matches the preset sensing information, whether the test keypad signal is received by the test device 130 is determined. If the test keypad signal is not received by the test device 130, then it is determined whether at least one physical characteristic information (e.g., the location of the object being sensed by the left camera and the right camera) of the test sensing information received indicates that an object being sensed is not detected (step S640). If at least one physical characteristic information indicates that the object being sensed is detected, then whether the test keypad signal is received is re-determined (back to step S630). In other words, if at least one physical characteristic information indicates that the object being sensed is not detected, then the third error message is generated (step S680). If the test keypad signal is received by the test device 130, then whether the test keypad signal matches the preset keypad signal corresponding to the preset sensing information is determined (step S650). If the test keypad signal does not match the preset keypad signal, then the second error message is generated (step S670). In other words, if the test keypad signal matches the preset keypad signal, then it is determined that the touch device 110 works properly (step S690).

For example, with reference to FIG. 3 and FIG. 8 again, the tester places 5 fingers on the touch device 110 according to the instruction from the user interface 300 of the test program 134 and moves the fingers upwardly according to the gesture instruction. When the user interface 300 of the test program 134 instructs 5 fingers, and the gesture output is present, then whether the touch device 110 works properly may be determined according to the $4^{th}$ row (i.e., at least three objects being sensed, touch gesture detected) of the preset table 8. The test program 134 periodically checks to see whether the test keypad signal is received (e.g., every 5 seconds). If the test keypad signal is not received, then the test program 134 requests the test sensing information from the touch device 110. After the test sensing information is sent again by the touch device 110, if the test program 134 determines that the object being sensed does not exist according to the location of the object being sensed in the test sensing information obtained by the left camera and the right camera, then an error message, for example, "Failed! Test keypad signal is not detected!" may be displayed as the text instruction 310 on the user interface 300 of the test program 134, as shown in FIG. 3. If it is determined that the object being sensed still exists according to the location of the object being sensed in the test sensing information obtained by the left camera and the right camera, then the test device 130 continues periodically checking to see whether the test keypad signal is received (e.g., every 0.1 sec, 0.5 sec, etc.). If the test keypad signal is received by the test device 130, then it is determined whether the test keypad signal is the preset keypad signal of the simulated key A. If the received test keypad signal is not from the key A (e.g., key A, key B, etc.), the error message, for example, "Failed! Wrong gesture!" or "Failed! Keypad signal is incorrect" is displayed as the text instruction 310, as shown in FIG. 3. In other words, if the received test keypad signal is from the key A, then a success message, for example, "Passed" is displayed as the text instruction 310, as shown in FIG. 3. However, the invention is not limited to the tests described in the present example, and the tests may be modified according to the tester/developer's needs.

With reference to FIG. 2 again, after the test result is generated according to the above embodiments, in the step S270, the test device 130 determines whether the touch device 110 works properly. In detail, the paragraphs above state that the test device 130 judges the test sensing information, the test gesture signal, and the test keypad signal according to the preset table so as to generate the test result. The test result is stored in the database 136 for the developer/tester to do further analysis. The test result may also be displayed on the test interface (e.g., the user interface 300 in FIG. 3) of the test program 134, so that the developer/tester may record the test result for proceeding to the next test.

In conclusion, the touch device provided by the embodiment of the invention may generate the gesture signal and/or the keypad signal according to the user's operation. The touch device or devices connected to the touch device may perform the corresponding actions based on the gesture signal and/or the keypad signal. The test device may compare the gesture signal and/or the keypad signal corresponding to the user's operation in the preset table with each signal generated by the touch device and make judgment upon the comparison, so as to determine if the functions work properly. Thus, the testing system provided by the embodiment of the invention may integrate the inspection of the basic touch function and the keypad signal function and may also speed up the testing process of each touch device on the assembly line in an automated manner. By doing so, the tester does not need to waste his or her time on determining whether each touch device works properly during the testing process. In addition, the testing system may store the test result of the tested touch device for the tester/developer to conduct further analysis.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A testing method of a touch device, applicable to a test device connected to the touch device, wherein the testing method comprising:
    displaying a text instruction, a number of objects to be sensed, and a direction to be performed on a user interface of the test device to instruct a tester to apply gestures on the touch device;
    in response to the gestures of the tester detected by the touch device, receiving, by a data transmission interface of the test device from the touch device, test sensing information, a test gesture signal, and a test keypad signal generated by the touch device, wherein the test sensing information comprises a test header of a gesture output and a location of at least one object being sensed, wherein the test gesture signal comprises the number of the at least one object being sensed and coordinate information thereof, and wherein the test keypad signal comprises at least one keypad key triggering signal for simulating at least one keypad key on a traditional keyboard;
    determining whether the test sensing information, the test gesture signal, and the test keypad signal match data in a preset table,
        wherein the preset table comprises preset sensing information, preset gesture signals, and preset keypad signals corresponding to different numbers of objects being sensed,
        wherein, in the preset table, for each of the numbers of the objects being sensed:
            the corresponding preset sensing information comprises a preset header sensing information of a preset gesture output and preset locations of the objects being sensed,
            the corresponding preset gesture signal comprises preset coordinate information of the objects being sensed, and
            the corresponding preset keypad signal comprises a preset keypad key triggering signal;
    determining that the touch device works properly when the test sensing information, the test gesture signal, and the test keypad signal respectively match the preset sensing information, the preset gesture signal, and the preset keypad signal corresponding to the number of the at least one object being sensed; and
    determining that the touch device does not work properly when any of the test sensing information, the test gesture signal, and the test keypad signal does not respectively match the preset sensing information, the preset gesture signal, and the preset keypad signal corresponding to the number of the at least one object being sensed.

2. The testing method according to claim 1, wherein the step of determining whether the test sensing information, the test keypad signal, and the test gesture signal match the data in the preset table includes the following steps:
    determining whether the test sensing information matches the preset sensing information in the preset table;
    if the test sensing information matches the preset sensing information, determining whether the test gesture signal matches the preset gesture signal corresponding to the preset sensing information in the preset table, and determining whether the test keypad signal matches the preset keypad signal corresponding to the preset sensing information in the preset table;
    determining the touch device works properly if the test gesture signal matches the preset gesture signal and if the test keypad signal matches the preset keypad signal.

3. The testing method according to claim 2 further including:
    generating a first error message to indicate the touch device does not work properly if the test sensing information does not match the preset sensing information.

4. The testing method according to claim 2 further including:
    generating a second error message to indicate the touch device does not work properly if the test keypad signal does not match the preset keypad signal.

5. The testing method according to claim 2 further including:
    generating a second error message to indicate the touch device does not work properly if the test gesture signal does not match the preset gesture signal.

6. The testing method according to claim 1, further comprising:
    determining a type of the test sensing information sent by the touch device according to the test header of the test sensing information.

7. The testing method according to claim 1, wherein the touch device is equipped with an optical touch screen, and wherein the location of each of the at least one object is detected by each of a plurality of optical cameras.

* * * * *